Dec. 7, 1965
C. A. MATTSON ETAL
3,221,481
COMBINATION LAWN EDGER AND TRIMMER
Filed Aug. 19, 1963
5 Sheets-Sheet 3
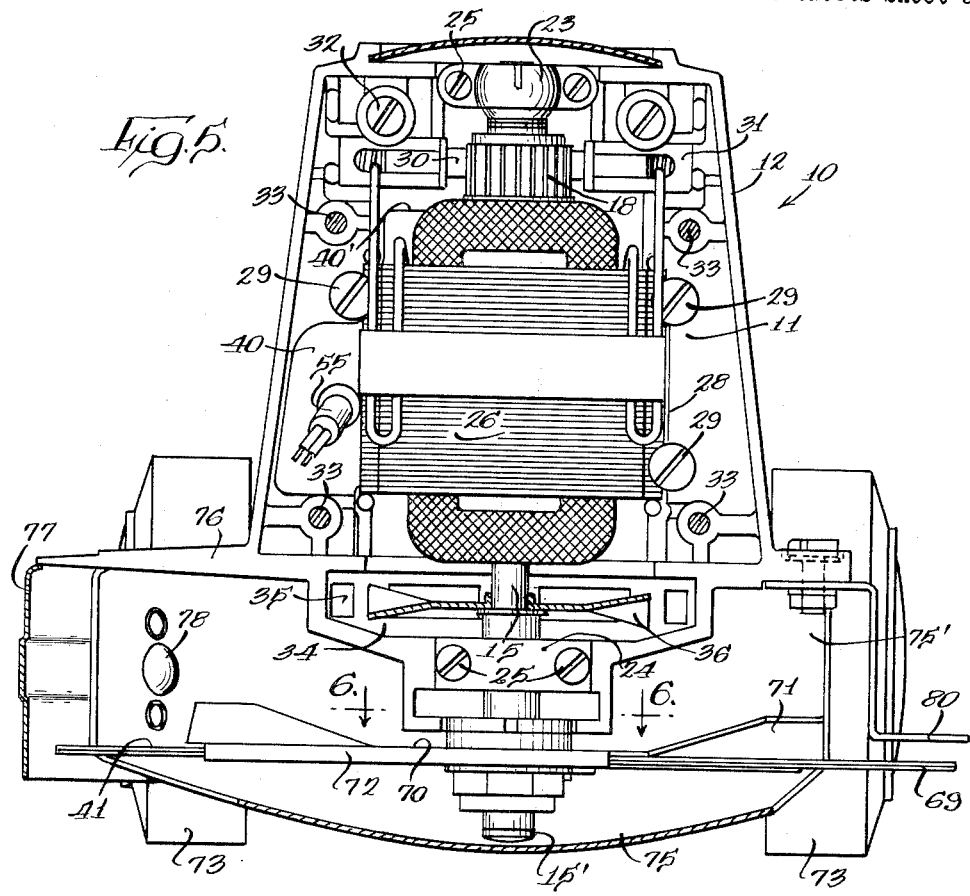
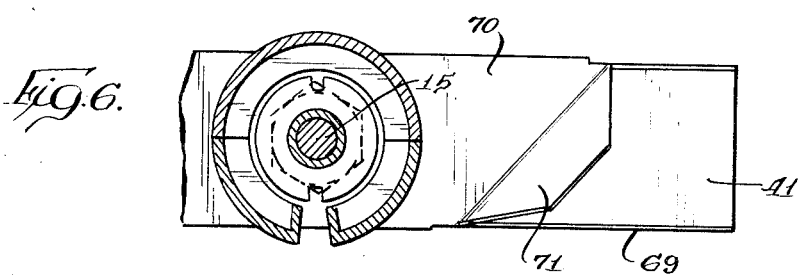
INVENTORS:
CHARLES A. MATTSON
MARVIN R. OLSEN
FREDRICK O. OTTOSEN, DECEASED
BY HARRIET OTTOSEN, EXECUTRIX
BY *George R. Clark*
*Atty*

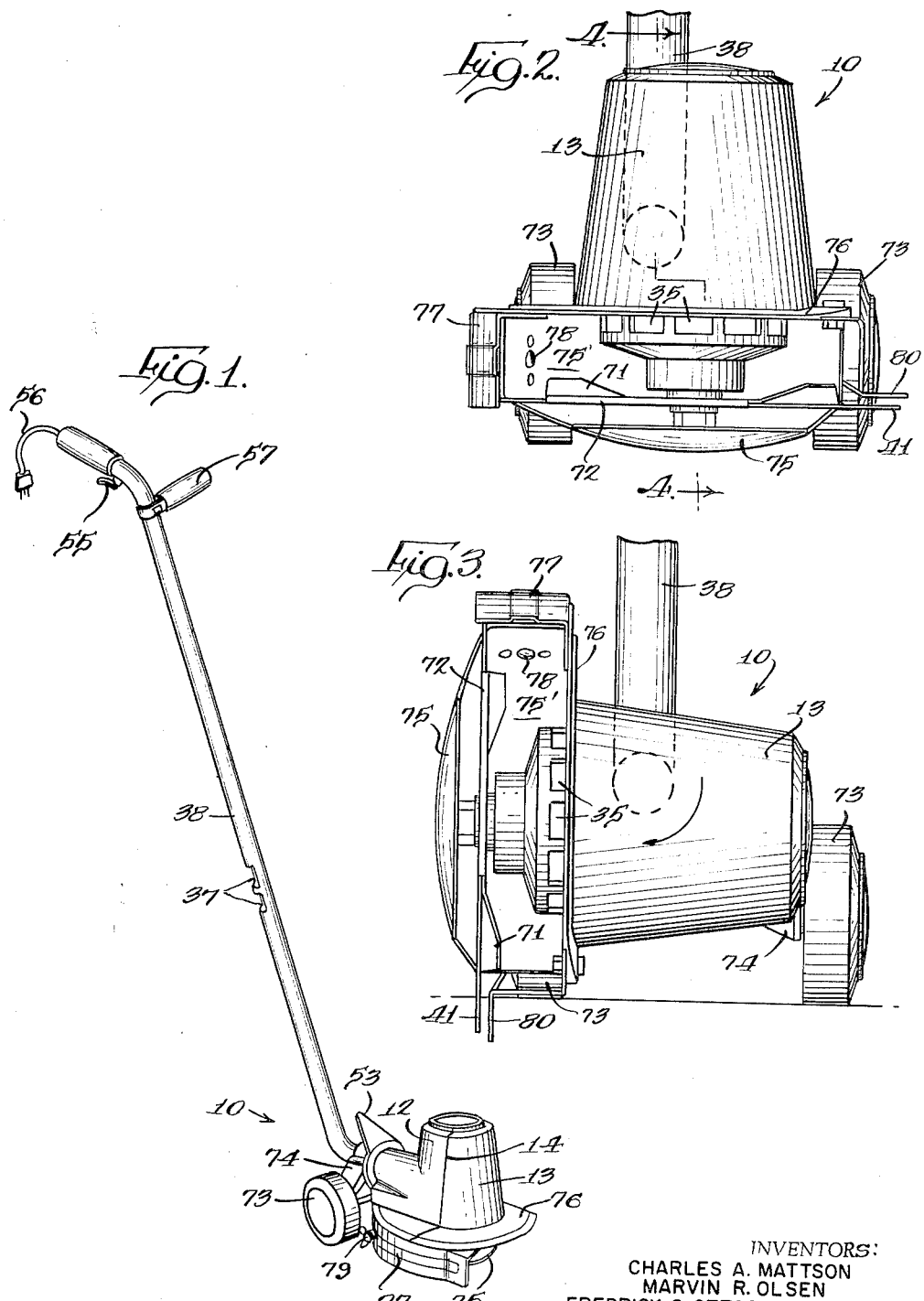

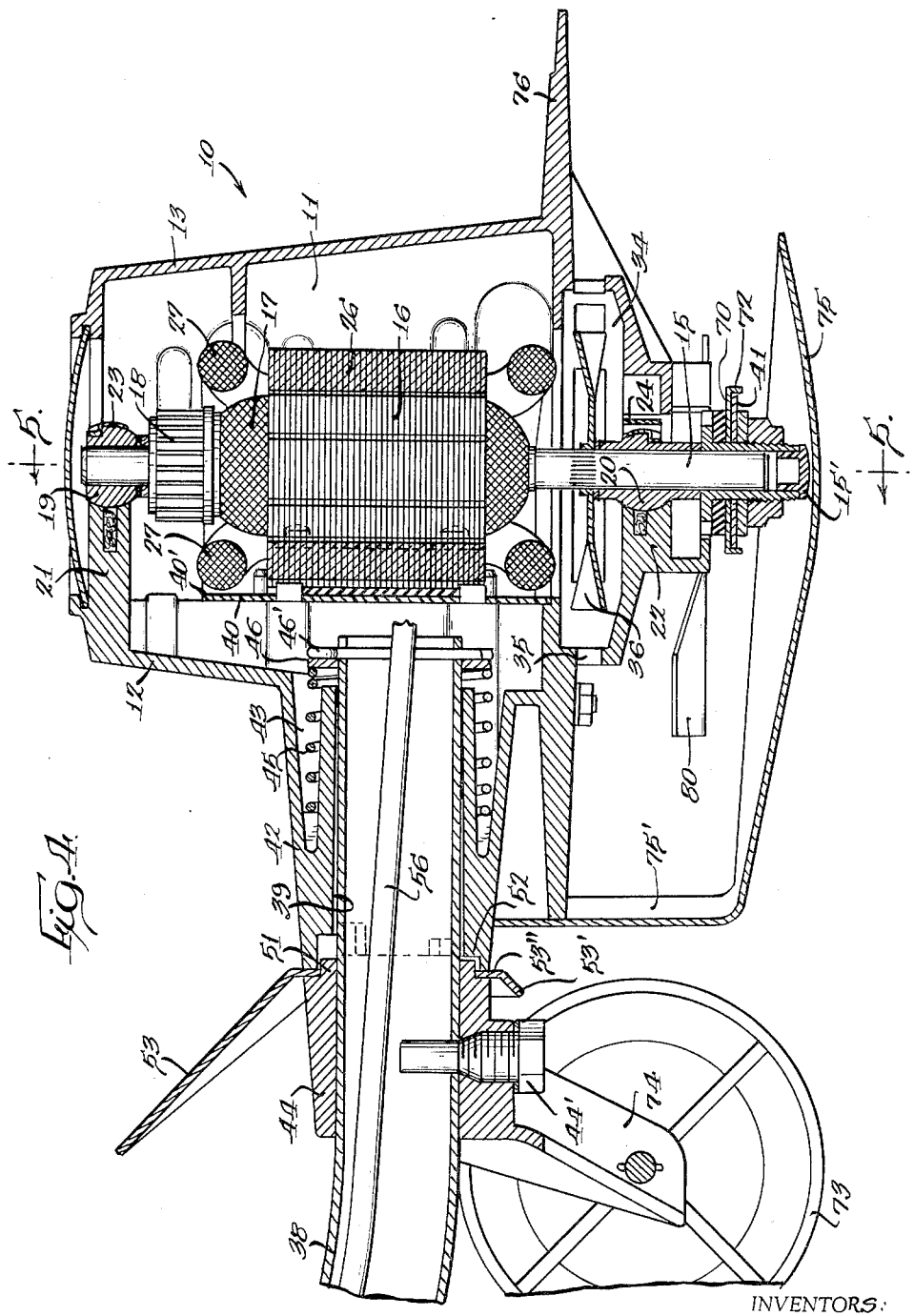

Dec. 7, 1965  C. A. MATTSON ETAL  3,221,481
COMBINATION LAWN EDGER AND TRIMMER
Filed Aug. 19, 1963  5 Sheets-Sheet 5
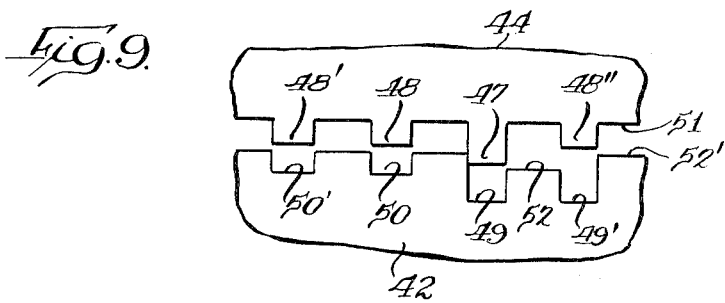
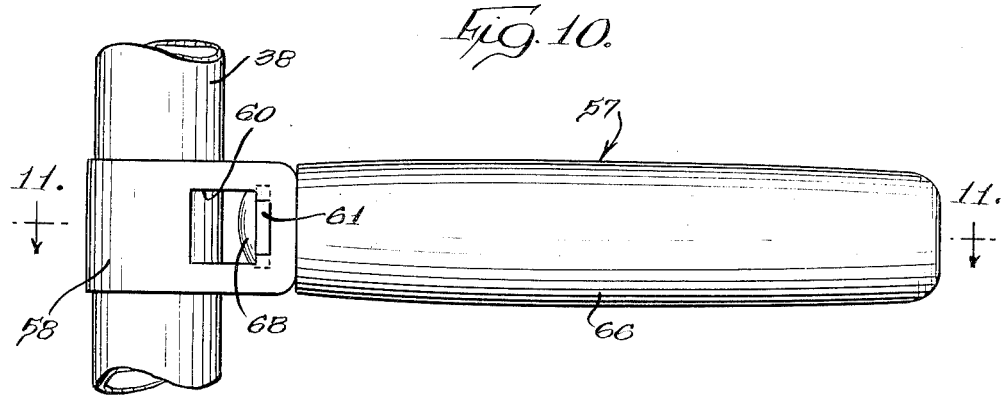
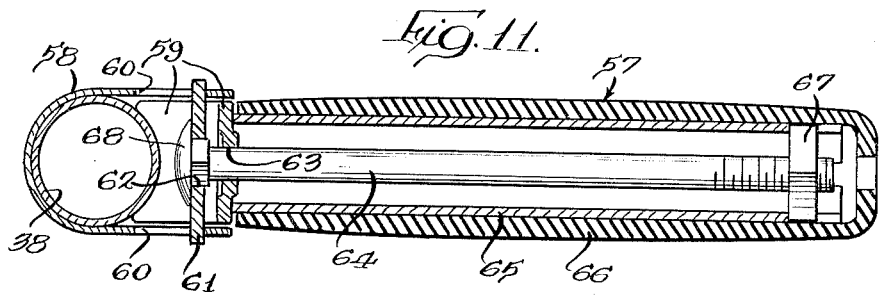
INVENTORS:
CHARLES A. MATTSON
MARVIN R. OLSEN
FREDRICK O. OTTOSEN, DECEASED,
BY HARRIET OTTOSEN, EXECUTRIX
BY George R. Clark
Atty

United States Patent Office 3,221,481
Patented Dec. 7, 1965

3,221,481
COMBINATION LAWN EDGER AND TRIMMER
Charles A. Mattson, Oak Park, Ill., Marvin R. Olsen, Glen Ellyn, Ill., and Frederick O. Ottosen, deceased, late of Chicago, Ill., by Harriet Ottosen, executrix, assignors to Sunbeam Corporation, Chicago, Ill., a corporation of Illinois
Filed Aug. 19, 1963, Ser. No. 303,474
4 Claims. (Cl. 56—25.4)

This invention relates to improvements in devices for trimming and edging lawns.

It is an object of this invention to provide an improved casing for trimmers and edgers to facilitate assembly of the motor and service and repair work.

It is a further object of the invention to provide an improved cooling circuit for the motor of trimmers and edgers.

It is a further object of the invention to provide an improved adjustable mounting between the housing and guide handle of a trimmer-edger device so that the device can be easily converted into a trimmer or edger.

It is a further object of this invention to provide an improved auxiliary handle for trimmers and edgers.

It is a further object of this invention to provide improved means in trimmers for drawing the grass into the cutter blade.

It is still a further object of the invention to provide an improved adjustable cutter blade shield in trimmer-edger devices.

The invention will be better understood by considering the following description taken in connection with the accompanying drawings, and its scope will be pointed out in the appended claims.

In the drawings:

FIG. 1 is a perspective view of an edger-trimmer device;

FIG. 2 is an enlarged front view of the device when used as a trimmer;

FIG. 3 is an enlarged front view of the device when used as an edger;

FIG. 4 is an enlarged sectional view taken along the section line 4—4 of FIG. 2;

FIG. 5 is a sectional view taken along the section line 5—5 of FIG. 4;

FIG. 6 is a sectional view taken along the section line 6—6 of FIG. 5;

FIG. 9 is a developed view of the lug and notch lock and stop means of the adjustable mounting;

FIG. 10 is an enlarged side view of the auxiliary handle; and

FIG. 11 is a sectional view taken along the section line 11—11 of FIG. 10.

Figure 7:
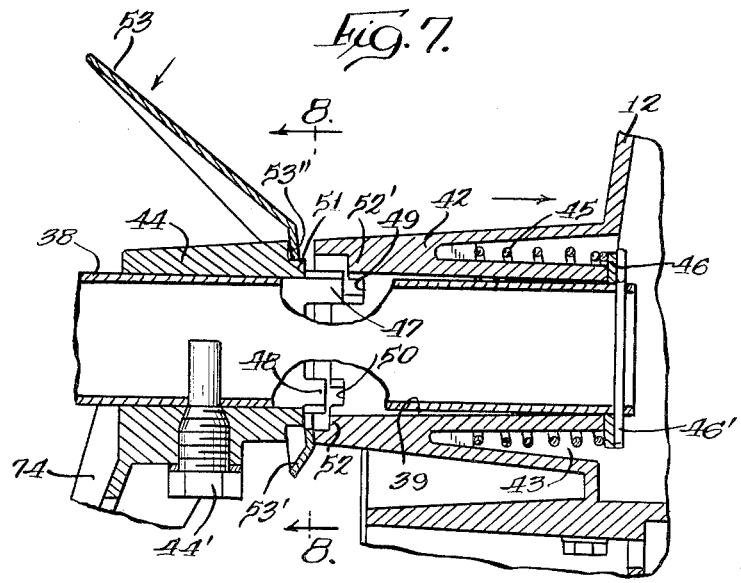
FIG. 7 is a sectional view similar to the left hand part of FIG. 4 illustrating how the adjustable mounting between the motor housing and guide handle is operated.

Briefly, in the invention the motor housing is split into complementary rear and front sections with the motor being completely assembled in the rear section and the the front section serving as a cover for the rear section and its assembled motor. A tubular handle is connected to the rear portion of the housing. The air inlet for cooling the motor is formed in the guide handle. The motor drives a motor cooling fan and the fan exhausts are located in the bottom portion of the motor housing. A baffle is positioned between the motor and the entrance of the front end of the handle into the housing to direct the incoming air first up to the top of the motor and then down thereover.

The adjustable mounting between the motor housing and guide handle comprises a pair of collar-like members. Preferably, one collar is an integral portion of the rear of the housing. It receives the front end of the handle and is movable rotatably and axially with respect thereto. The other collar is positioned behind the first one and is fixed with respect to the guide handle and has ground engaging rollers or the like mounted thereon. The contiguous ends of the collars are biased towards each other by a spring inside the housing active on the first collar to drive it towards the second collar. Also, the contiguous ends of the collars have cooperative lugs and notches to provide lock and stop means between the two collars. The lock means is disengaged manually by a lever having an annular disc-like portion mounted on the guide handle between the contiguous ends of the collars. When the lever is depressed the disc is effective to unlock the lock means so that the motor housing can be shifted between vertical and horizontal position.

The auxiliary handle comprises a pair of U-shaped brackets which are nested with respect to each other in opposed and 90 degree shifted relationship about the main guide handle. Means is provided inside the auxiliary handle to loosen or tighten these brackets with respect to the main guide handle merely by turning the auxiliary handle.

Fan action is provided for drawing grass into the cutter blade by a flat thin elongated member which is shorter than the flat thin elongated cutter blade and superposed thereon in aligned relationship. The diametrically opposite edges or corners of the superposed member which correspond to the diametrically opposite leading cutting edges of the cutter blade are turned away therefrom to serve as vanes to provide fan action for drawing grass into the cutter blade.

The adjustable shield for the cutter blade comprises an elongated arcuate member which is disposed along the upper edge of the plane of rotation of the cutter blade when it is operating as an edger. The rear end of the shield is pivotally mounted on the rear of the motor housing. When the device is being used as a trimmer the shield is pivoted 180 degrees to a position behind the plane of rotation of the cutter blade for storage in an out of the way location.

Referring now first to FIGS. 1–3, shown therein is a housing 10. This housing 10 encloses a motor 11, see FIGS 4 and 5. The housing is split into rear and front sections 12 and 13, see FIGS. 1 and 3, along a line 14.

As illustrated in FIGS. 4 and 5, the motor 11 is completely assembled in the rear section 12 and the front section 13 serves as a cover for the rear section and its assembled motor. The motor comprises a vertical drive shaft 15, see FIG. 4. Shaft 15 carries the armature comprising an armature core 16, its windings 17 and a commutator 18. The upper and lower ends of shaft 15 are supported by bearings 19 and 20, resectively. Bearings 19 and 20 are seated on integral portions 21 and 22, respectively, of rear section 12. Bearings 19 and 20 are retained in position by bearing retainers 23 and 24, respectively, see FIG. 5, and suitable screws or studs 25 secured to portions 21 and 22.

The field for motor 11 comprises a stator core 26 and its windings 27, see FIG. 4. The stator core 26 is supported on integral ledges or the like 28 formed on rear section 12, see FIG. 5. Stator core 26 is retained in position on ledges 28 by suitable screws or studs 29 which enter integral portions of rear section 12.

Commutator brushes 30, see FIG. 5, are provided for the commutator 18. Brushes 30 are assembled in brush guide holders 31 which are supported in integral portions of rear section 12. Brush guide holders 31 are retained in position by screws or studs 32 entering integral portions of rear section 12.

Thus the motor 11 is completely mounted in the rear section 12. Front section 13 serves as a removable cover for rear section 12 and its motor 11. Sections 12 and 13 are clamped together by screws or studs 33, see FIG. 5. Cover 13 is removable so that motor 11 can be inspected and serviced while in operative condition.

Formed in the bottom of housing 10 below motor 11 is a fan chamber 34 having exhaust openings 35. A fan 36 is mounted on shaft 15 in fan chamber 34. Fan 36 draws air into housing 10 to cool the motor 11. The air inlets 37, see FIG. 1, for cooling air are formed in the main guide handle 38. Handle 38 is tubular. It extends rearwardly from housing 10. An opening 39 is formed in the rear portion of housing 10. The front end of handle 38 is received in opening 39. Therefore, air enters housing 10 by way of air inlets 37, handle 38, and opening 39. An air directing baffle 40 is disposed between the opening 39 and front end of handle 38 and the motor 11. This baffle extends across section 12, see FIG. 5, behind motor 11. It is vertically disposed so that the incoming air has to first travel to the top of the motor over the upper edge 40' of baffle 40 and then down along the length of the motor for effective cooling thereof. Placing the air inlets 37 in handle 38 has the advantage that no cut grass is drawn into the motor. Placing the exhaust vents 35 in the bottom of the housing 10 has the advantage that the exhausted air helps to prevent cut grass from building up on the bottom of the motor housing.

In FIG. 2 the device is illustrated being used as a trimmer. The cutter blade 41 rotates in a horizontal plane about a vertical axis. That is, the housed motor is vertically disposed. In order to edge lawns the housed motor is shifted 90 degrees in a clockwise direction relative to the front end of handle 38, as illustrated in FIG. 3. In this position of the device the plane of rotation of the blade is vertically disposed, and the axis of the housed motor is horizontal. Referring now to FIGS. 4 and 7 to 9, the means for adjustably mounting the housing on the front end of the guide handle 38 will now be described.

The opening 39 in the rear portion of housing 10 is defined by an integral collar or tubular portion 42 of housing rear section 12. The front end of collar or tubular portion 42 is double walled to define a blind recess 43. The front end of handle 38 extends through collar 42 into the housing 10. The collar 42 receives the front end of handle 38 loosely so that it is free to rotate and move axially with respect thereto. Behind collar 42 is positioned another collar or hub portion 44. This collar is fixed to the handle 38 against rotary and axial movement by means such as a stud 44'. A coil spring 45 is disposed inside housing 10. It surrounds the inner end of collar 42 by being disposed in recess 43. It bottoms against the blind end of recess 43 and at its inner end bears against a washer or the like 46 connected to the inner end of handle 38 by a cotter pin or the like 46'. Therefore, spring 45 has the effect of biasing the contiguous ends of collars 42 and 44 into engagement with each other.

Figure 8:
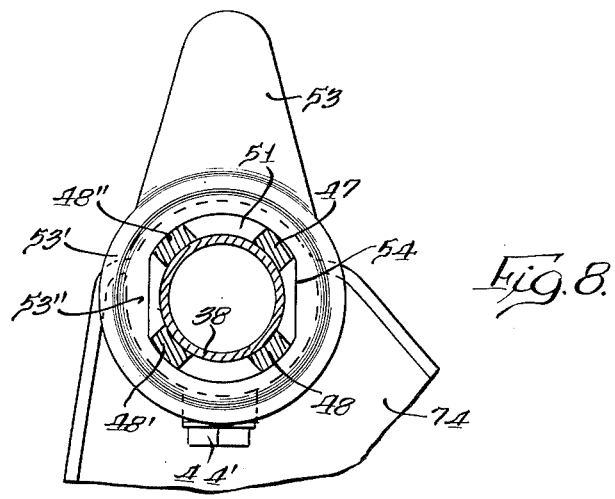
FIG. 8 is a sectional view taken on the section line 8—8 of FIG. 7.

Lock and stop means comprising four lugs 47, 48, 48', 48" are provided on the collar 44, see FIGS. 7 to 9. Positioned in front of these lugs on the collar 42 are four notches 49, 50, 50', 49', respectively. Lugs 48, 48', 48" are of equal height whereas lug 47 is slightly longer. These lugs are formed on a shoulder 51 of collar 44. The notches 49, 49' are of equal depth, but are slightly deeper than the notches 50, 50' which are also of equal depth. The notches are formed in a shoulder 52 of collar 42. When the motor is vertically positioned for use of the device as a trimmer, the lugs 47, 48 48', 48" are seated in the notches 49, 50, 50', 49', respectively. When the motor is horizontally positioned for use of the device as an edger, the lugs 47, 48, 48', 48" are seated in the notches 49', 49, 50, 50', respectively.

Between the notches 49, 49' the part 52' of shoulder 52 is reduced slightly in height to clear the lugs 47 as it moves between the notches 49, 49'. Thus, all the lugs and notches operate as releasable locking means to lock the housing in either of its two positions with respect to the handle. Additionally, the lug 47 and notches 49, 49' operate as stop or limit means for preventing the housing from being positioned in any position other than these two positions. The lugs and notches are spaced with respect to each other by 90 degrees. That is, the 90 degree spaced notches 49, 49' limit movement of the lug 47 to 90 degrees. Therefore, the housing can be turned correctly only for 90 degrees to either a vertical or horizontal position as illustrated in FIGS. 2 and 3.

The means for disengaging the lugs and notches to permit rotation of the housing comprises the lever 53 which has an integral annular portion 53'. Opposite sides of the shoulder 51 and that flat or disc part 53" of the annular portion 53' are straight as indicated by reference numeral 54, see FIG. 8, so that the lever 53 is retained directed in an upward direction. The part 53" is located between the continguous ends of the collars 42 and 44. When lever 53 is depressed, part 53" will overcome the bias of spring 45 and separate the collars 42 and 44 to disengage the lugs and notches so that the housing can be shifted. Release of the lever 53 permits the spring 45 to return the lugs and notches to locked position.

The upper end of the handle 38 has a finger operated switch 55 and an electrical connector cord 56. The cord extends through the handle 38 for connection to the motor.

Mounted on the upper end of main guide handle 38 is an auxiliary handle 57. This handle is adjustable about and along the handle 38. It comprises a pair of U-shaped clamping brackets 58 and 59. These brackets are nested one within the other in opposed and 90 degree shifted relationship. A pair of notches 60 is formed in the opposite ends of the bracket 58. A cross-piece 61 spans these notches. Aligned apertures 62 and 63 are formed in the cross-piece 61 and bight portion of the bracket 59. A stud 64 extends through these apertures into a metallic tubular member 65 which is surrounded by a plastic or insulating material sleeve 66. A nut 67 is held captive in the outer end of sleeve 66. The outer threaded end of stud 64 enters nut 67. Thus, when the handle 57 is turned, the inner end of tubular member 65 bears on bracket 59 and the head 68 of the stud 64 bears on cross-piece 61 to urge the two brackets towards each other into clamping relationship with the main handle 38. A few turns of the handle 57 will sufficiently loosen the connection so that the auxiliary handle can be moved to any desired position and then retightened.

Referring now to FIG. 6, the cutter blade 41 mounted at the lower end of armature shaft 15 is thin, flat, and in the shape of an elongated rectangle. It is removably mounted on the shaft 15 in a manner well known in the art. It has a pair of diametrically opposite leading cutting edges 69 formed at its outer ends. That is to say, when viewing FIG. 6 the blade 41 rotates clockwise. Superposed on blade 41 is another thin, flat and generally elongated rectangular shaped member 70. It is shorter than the blade 41 so as not to interfere with edging by the blade. Its diametrically opposite corners 71 corresponding to the leading cutting edges 69 have been turned away from the edges 69. These corners 71 act as vanes to provide fan action to suck or draw grass into the cutter blade when the device is being used as a trimmer. The lengthwise edges 72, see FIG. 4, of the member 70 have been turned down to retain it aligned with the cutter 41. The member 70 makes it possible to use a blade which is lower cost than those on the prior art which have integral vanes or the like formed thereon, and the member 70 can be used with new blades.

The device is provided with a pair of wheels 73 or the like for engaging the ground. The wheel supports 74 are integral parts of the hub or collar 44. Positioned beneath the device is a slightly concave-shaped plate 75. This plate assists in guiding the device along the lawn and prevents scalping of the lawn when rises and depressions in the lawn are encountered. The plate 75 has an integral upright back plate part 75' which extends for about 90 degrees about the device. Plate 75 is suspended off the housing 10 by not shown studs or the like connecting back plate part 75' to the rear portion of housing 10. Mounted on the lower end of armature shaft 15 is a nylon or the like impact member 15' to act as a stop for the plate 75 in the event it is deflected upwardly. In the absence of impact member 15' on the end of shaft 15, an additional support would have to be provided for plate 75 which would interfere with proper discharge of the grass clippings. Housing 10 is provided with an integral deck or the like 76. The parts 75, 75', 76 in a general way define a chamber for the cutter blade 41. The front side of this chamber, of course, is open. The right side of this chamber, when viewed from the rear of the device, is also open when it is being used as a trimmer. However, when the device is being used as an edger, this open side is closed by a shield or guard 77. The guard 77 is a necessary protection for the user when edging since at that time the mentioned open side is positioned uppermost and the blade is rotating in a vertical plane. The guard 77 is an elongated arcuate member. It extends for about 90 degrees similar to the back plate 75'. In fact, it is shaped very similar to the back plate 75' and when not in use is positioned behind the same in superposed out of the way stored position. The rear end of the guard 77 is pivotally connected to the right side of back plate 75' by means such as stud 78 and wing nut 79. By loosening nut 79 the guard 77 can be swung downwardly through 180 degrees between its in use and stored position. The other side of the cutter blade chamber has a right angle shaped guide 80 positioned therealong. The guide 80 is supported off the deck 76 and guides the device along the edge of sidewalks or the like for edging lawns in a manner well known to those skilled in the art.

While there has been illustrated and described a particular embodiment of the present invention, it will be understood that changes and modifications may occur to those skilled in the art, and it is, therefore, contemplated by the appended claims to cover all such changes and modifications as fall within the true spirit and scope of the present invention.

What is claimed as new and desired to be secured by Letters Patent of the United States is:

1. In an edger-trimmer, a tubular handle, said handle having a round cross section, said handle being directed downwardly and forwardly and having an integral front end which is horizontal with respect to the ground, a collar journaled on said horizontal front handle end for rotary and axial movement, a motor housing connected to said collar, a vertically disposed motor in said housing, a horizontally disposed cutter blade positioned below said housing, a drive connection between said motor and blade, a pair of notches formed in the rear edge of said collar, said notches being spaced with respect to each other by 90 degrees, a locking lug fixed to said horizontal front handle end behind said collar, a coil spring disposed about said horizontal front handle end inside said housing for biasing said collar rearwardly toward said locking lug, said locking lug being adapted to enter either one of said notches to lock said collar against rotation whereby said housing is fixed to said handle for either a horizontal or vertical disposition of said cutter blade, and means for releasing said collar, said releasing means comprising a manually operable member on said horizontal front handle end, said manually operable member being disposed behind said collar and being adapted to urge said collar axially away from said locking lug against the bias of said coil spring.

2. In an edger-trimmer as in claim 1, a guard for the cutter blade, said guard comprising an arcuate member extending in a front to back direction along one side of the plane of rotation of the cutter blade, said arcuate member being disposed vertically below said housing, the rear end of said arcuate member being pivotably connected to said housing and the remainder thereof being free for swinging said arcuate member downwardly through an arc of 180 degrees to another position below said housing and behind said plane of rotation of the cutter blade.

3. In an edger-trimmer, a tubular handle, said handle having a round cross section, said handle being directed downwardly and forwardly and having an integral front end which is horizontal with respect to the ground, a collar journaled on said horizontal front handle end for rotary and axial movement, a motor housing connected to said collar, a vertically disposed motor in said housing, a horizontally disposed cutter blade positioned below said housing, a drive connection between said motor and blade, a support assembly surrounding said horizontal front handle end, said support assembly being disposed behind said collar and being fixed to said handle, a pair of ground engaging wheels mounted on said support assembly, a spring inside said housing for biasing said collar rearwardly toward said support assembly, engageable notch and lug means formed on contiguous portions of said support assembly and collar for locking said collar to said handle to fix said housing for a horizontal or vertical disposition of said blade, and means for manually disengaging said notch and lug means comprising a plate positioned on said horizontal front handle end between said collar and support assembly, said plate having an integral lever portion for rocking said plate to urge said collar away from said support assembly against the bias of said spring.

4. In an edger-trimmer as in claim 3, wherein said motor housing comprises essentially two members, said motor being mounted entirely on one of said members, and the other member comprising essentially a cover for said one member and its mounted motor, a fan in said housing below said motor for cooling said motor, a drive connection between said fan and motor, air exhaust openings formed in said housing adjacent said fan, and air inlet openings formed in the back side of said handle vertically above said horizontal front handle end, the forwardmost extremity of said handle extending through said collar into said housing whereby cooling air for said motor enters said housing through said handle, and a switch at the upper end of said handle for controlling said motor, electrical leads connecting said switch to said motor, said electrical leads extending between said switch and motor through said handle and into said housing through said forwardmost extremity of said handle.

References Cited by the Examiner

UNITED STATES PATENTS

| | | | |
|---|---|---|---|
| 2,519,936 | 8/1950 | Sayre | 56—25.4 XR |
| 2,597,774 | 5/1952 | Britten | 56—25.4 |
| 2,660,847 | 12/1953 | Britten | 56—25.4 |
| 2,793,485 | 5/1957 | Emmons et al. | 56—25.4 |
| 2,795,095 | 6/1957 | Kaufman | 56—25.4 |
| 2,827,311 | 3/1958 | Kasper. | |
| 2,832,184 | 4/1958 | Beuerle | 56—25.4 |
| 2,867,960 | 1/1959 | Stiles et al. | 56—25.4 |
| 3,034,275 | 5/1962 | Happe et al. | 56—25.4 |
| 3,056,249 | 10/1962 | Shaw | 56—25.4 |
| 3,079,743 | 3/1963 | Egley | 56—25.4 |

ABRAHAM G. STONE, *Primary Examiner.*

ANTONIO F. GUIDA, T. GRAHAM CRAVER,
*Examiners.*